United States Patent [19]

Sukata et al.

[11] Patent Number: 5,501,934
[45] Date of Patent: Mar. 26, 1996

[54] CHARGEABLE RESIN POWDER

[75] Inventors: Kazuaki Sukata, Yawata; Shun-ichiro Yamanaka, Hirakata; Shuji Sugawara, Neyagawa, all of Japan

[73] Assignee: Orient Chemical Industries, Ltd., Osaka, Japan

[21] Appl. No.: 293,848

[22] Filed: Aug. 22, 1994

[30] Foreign Application Priority Data

Aug. 23, 1993 [JP] Japan ................................. 5-231016

[51] Int. Cl.$^6$ .................................................. G03G 9/097
[52] U.S. Cl. ......................................................... 430/110
[58] Field of Search ................................. 430/106, 109, 430/110

[56] References Cited

U.S. PATENT DOCUMENTS 5,188,929  2/1993  Ishii .
5,318,883  6/1994  Yamanaka et al. ..................... 430/110

FOREIGN PATENT DOCUMENTS 83201162  8/1983  European Pat. Off. .

OTHER PUBLICATIONS

Makoto et al. Toner for developing electrostatic charge image Patent Abstracts of Japan, vol. 15, No. 116.
Heihachi et al. Positive chargeable toner Patent Abstracts of Japan vol. 15, No. 234.
Orient Kagaku Kogyo KK Colorless charge controlling agent for toner World Patent Index.
Hitachi Ltd. Electrophographic toner useful for laser printer and copying machine World Patent Index.
Sanefumi et al. Wet type developer for developing electrostatic latent image Patent Abstracts of Japan vol. 15, No. 515.
Kazumasa et al. Electrically conductive paint Patent Abstracts of Japan vol. 12, No. 326.
Akio et al. Cationic electro–deposition coating compound composition Patent Abstracts of Japan vol. 13, No. 61.

*Primary Examiner*—John Goodrow
*Attorney, Agent, or Firm*—McGlew and Tuttle

[57] ABSTRACT

Chargeable resin powder, toner for developing electrostatic images and powder coating for electrostatic painting comprising at least a thermosetting resin or a thermoplastic resin, and a charge control agent or a charge enhancer, wherein a host-guest compound formed from a combination of a host compound and a guest compound is contained as a charge control agent or charge enhancer which controls or enhances resin powder charging.

17 Claims, No Drawings

CHARGEABLE RESIN POWDER

BACKGROUND OF THE INVENTION

1. Field of the Invention

The present invention relates to a chargeable resin powder which can be used in a toner for developing electrostatic images for use in electrophotography and other charging-based techniques, powder coatings for electrostatic painting, and so on.

2. Description of the Prior Art

In copying machines, etc. based on electrophotography, various dry or wet toners containing a coloring agent, a fixing resin and other substances are used to visualize (develop) the electrostatic latent image formed on the photoreceptor having a light-sensitive layer containing an inorganic or organic photoconductive substance. The chargeability of such toners is one of the most important factors in electrostatic latent image developing systems. Thus, to appropriately control or stabilize the amount of charges of the toner, a charge control agent providing a positive or negative charge is often added to the toner.

Also, in recent years, in the field of electrostatic painting, which is based on the charging phenomenon, the utility of solvent-free powder coatings has drawn attention from the viewpoint of labor saving in regard to painting efficiency, prevention of environmental pollution, ease of paint management, and the like. Electrostatic powder painting methods using powder coatings are classified into the corona charging method, the frictional charging method and the hybrid method. In any method, the paint powder must be given a sufficient amount of charges.

As charge control agents for controlling the charging of (colored) resin powders such as dry toners, there have been used electron acceptors having a good negative charge providing property, such as azo-metal complex dyes, aromatic oxycarboxylic acid-metal complexes and salts thereof, and electron donors having a good positive charge providing property, such as nigrosine dyes, triarylmethane dyes and other basic dyes, quaternary ammonium salt compounds, pyridinium salt compounds, imidazole compounds and polyamine resins.

Concerning electrostatic powder coatings, proposals as to application of charge control agents for electrophotographic toners have been considered to improve painting efficiency. Such proposals include an electrostatic powder coating containing a resin polymer of an azine dye such as nigrosine (dye composition) [Unexamined Japanese Patent Publication No. 67563/1985], a resin powder composition for electrostatic painting containing a charge enhancer such as a metal-containing complex compound (Unexamined Japanese Patent Publication No. 75077/1988), a powder coating composition containing a quaternary ammonium salt as a charge control agent or charge enhancer (Unexamined Japanese Patent Publication No. 212563/1990), a frictionally chargeable powder coating composition containing a nitrogen-containing compound such as a guanamine compound (Unexamined Japanese Patent Publication No. 775/1991), and an electrostatic painting method for a resin shaping product (object to be painted) prepared by kneading a complex of an alkylene oxide polymer and an electrolyte salt soluble therein in polypropylene resin, etc.

However, many toners using conventional charge control agents are faulty; for example, the toner charge distribution is uneven because the charge control agent is incompatible with, or poorly dispersible in, the binder resin for the toner, the resulting charge is not stably retained because the toners environmental stability is insufficient, and the charge stability in multiple repeated use of the toner is insufficient. Therefore, there is a need for development of a black toner or color toner containing a charge control agent or charge enhancer which meets practical requirements for such properties.

In electrostatic powder painting, to improve painting efficiency, it is necessary to provide the powder coating with a sufficiently high amount of charges by corona charging or by frictional charging between the painting machine's inside material (e.g., fluorocarbon polymer tube of a powder gun) and the powder coating. Such powder coating must be electrostatically adhered to iron, glass, plastic or the like and baked at 150° to 250° C. For these reasons, there is a need for a powder coating for electrostatic painting containing a charge control agent excellent in charge providing property and heat resistance.

Developed in view of the above problems in the prior art, the present invention is aimed at providing a chargeable resin powder, a toner for developing electrostatic images and a powder coating for electrostatic painting, all excellent in charge stability, charge providing property and heat resistance.

SUMMARY OF THE INVENTION

The present inventors investigated dry toners and powder coatings used in electrophotography and electrostatic painting, both based on the charging phenomenon, and found that a resin powder having sufficient chargeability (charge amount) and good charge stability can be obtained to solve the above problems by incorporating a host-guest compound in a toner resin or painting resin. The inventors made further investigations based on this finding, and developed the present invention.

Accordingly, the chargeable resin powder of the present invention comprises at least a thermosetting resin or a thermoplastic resin, and a charge control agent or a charge enhancer, wherein a host-guest compound formed from a combination of a host compound and a guest compound is contained as a charge control agent or charge enhancer which controls or enhances resin powder charging.

This chargeable resin powder may be such that said host compound is a cyclic or non-cyclic compound selected from the group consisting of calix arenes, cyclodextrins, cyclic polyethers and non-cyclic polyethers, and said guest compound is a compound selected from the group consisting of organic acids, inorganic acids, organic bases, inorganic bases and salts of these acids and bases.

The toner for developing electrostatic images of the present invention comprises the above-described chargeable resin powder, wherein said chargeable resin powder contains a coloring agent.

The powder coating for electrostatic painting of the present invention comprises the above-described chargeable resin powder.

The chargeable resin powder, toner for developing electrostatic images and powder coating for electrostatic painting of the present invention are excellent in charge stability, charge providing property and heat resistance. In addititon the resin powder, toner and powder coating cause almost no tone deterioration even when they are used in combination with various chromatic or achromatic coloring agents or used as substantially colorless powder because the charge control agent or charge enhancer therein is substantially colorless. For this reason, the toner for developing electrostatic images of the present invention is capable of stably forming a distinct toner image with almost no color tone deterioration, and the powder coating for electrostatic painting of the present invention is capable of stably forming an electrostatic painting film of high quality with almost no color tone deterioration. Also, the chargeable resin powder, toner for developing electrostatic images and powder coating for electrostatic painting of the present invention are very safe to the human body and environment because the charge control agent or charge enhancer contains no heavy metals, i.e. is heavy metal-free.

DETAILED DESCRIPTION OF THE INVENTION

The above-described chargeable resin powder, toner for developing electrostatic images and powder coating for electrostatic painting may incorporate coloring agents such as dyes and pigments, metal powders, fluidity improving agents, fillers, hardeners, plasticizers and other additives according to the use, purpose etc. thereof.

The host-guest compound as a charge control agent or charge enhancer as an essential component of the present invention is a complex compound resulting from incorporation of a guest compound by a host compound, via a relatively weak interaction such as hydrogen bonding or Van der Waals forces, and is also referred to as an inclusion compound or host-guest complex. As such, the host-guest compound is incorporated in the thermosetting resin or thermoplastic resin as a binder resin for toner or a resin for painting, etc. to prepare a resin powder such as a toner powder for a developer for electrophotography based on the (frictional) charging phenomenon, or a powder coating for electrostatic painting, whereby the charge of the resin powder is controlled or enhanced.

In general, with respect to charge control agents or charge enhancers having the salt structure $[A]^+[B]^-$, such as quaternary ammonium salts, the charging polarity is empirically known to depend on the molecular weights of A and B. Specifically, a positive charge occurs when A has a higher molecular weight; a negative charge occurs when B has a higher molecular weight. This has been confirmed by, for example, the relationship between the cationic component weight ratio and the amount of charges in quaternary ammonium salt type charge control agents or charge enhancers having the $[R_2NR'_2]^+X^-$ type structure (the amount of positive charges increases as the weight ratio of cationic components increases) [Anzai et al., 35th Joint Seminar of the Society of Electrophotography of Japan and the Institute of Electrostatics Japan, 1990].

The action of the host-guest compound in the present invention can be explained on the basis of the above empirical rule as follows: As expected from the above empirical rule, metal salts such as KF and KBr and ammonium salts having a lower alkyl group, such as tetramethylammonium halides, show almost no chargeability. However, when they are incorporated in host compounds as exemplified in the present invention to yield host-guest compounds, they show increased amounts of charges as a result of an increase in the molecular weight of the cationic or anionic moiety thereof. Improved compatibility with the binder resin resulting from the formation of the host-guest compound is also contributory to the increased and stabilized amount of charges. Example host compounds for producing host-guest compounds in the present invention include the following: calix arenes, cyclodextrins, cyclic polyethers and non-cyclic polyethers.

Calix arenes: A

Examples include the calix(n)arene derivatives described in Unexamined Japanese Patent Publication No. 201378/1990, represented by the following general formula:

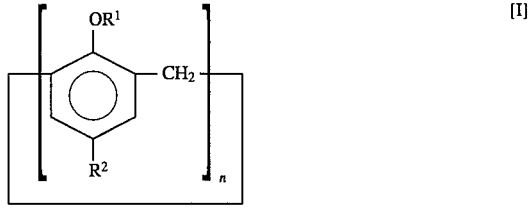

wherein n represents an integer from 4 to 8 (a single substance or a mixture is formed, depending on reaction conditions, etc.);

$R^1$ represents an alkyl group having 1 to 4 carbon atoms which may be branched or $-CH_2COR^3$ ($R^3$ represents an alkyl group or an alkoxy group);

$R^2$ represents an alkyl group having 1 to 8 carbon atoms which may be branched (e.g., tert-butyl group), a cycloalkyl group (e.g., cyclohexyl group) or an aryl group (e.g., phenyl group).

Specific calix(n)arene derivatives of the above formula include the following compounds 1 through 10 identified by n, $R^1$ and $R^2$ as follows.

| No. | $R^1$ | $R^2$ | n |
|---|---|---|---|
| 1: | $CH_3$ | tert-$C_4H_9$ | 8 |
| 2: | $C_2H_5$ | tert-$C_4H_9$ | 6 or 4 |
| 3: | $C_2H_5$ | tert-$C_4H_9$ | 4 |
| 4: | $CH_3$ | n-$C_8H_{17}$ | 4, 6 or 8 |
| 5: | $C_2H_5$ | Cyclohexyl | 4, 6 or 8 |
| 6: | $C_2H_5$ | Phenyl | 4, 6 or 8 |
| 7: | $CH_2COCH_3$ | tert-$C_4H_9$ | 4 or 6 |
| 8: | $CH_2COC_2H_5$ | tert-$C_4H_9$ | 4 |
| 9: | $CH_2COCH_3$ | tert-$C_4H_9$ | 4 or 6 |
| 10: | $CH_2COOC_2H_5$ | Phenyl | 4 |

Cyclodextrins: B

Examples include

α-cyclodextrin, which consists of six D-glucopyranose units cyclically bound via α-1,4 bonds, β-cyclodextrin, which consists of seven D-glucopyranose units cyclically bound via α-1,4 bonds, γ-cyclodextrin, which consists of eight D-glucopyranose units cyclically bound via α-1,4 bonds, and cyclodextrin derivatives wherein the hydroxyl group or methylol group of D-glucose is modified by a methyl group or an amino group.

Cyclodextrins as modified by substituent addition are also included. In this case, the substituent generally substitutes for one or more hydroxyl groups on the cyclodextrin ring or one or more hydrogen atoms of the hydroxyl groups.

Example substituents include acyl groups [one or more hydroxyl groups are substituted by a group such as —OAc, —OC(O)$CH_2CH_3$, —OC(O)$(CH_2)_2CH_3$, —OC(O)$(CH_2)_3CH_3$, —OC(O)$CF_3$ or —OC(O)Ph];

alkyl groups and aryl groups [one or more hydroxyl groups are substituted by a group such as —OCH$_3$, —OCH$_2$CH$_3$, —O(CH$_2$)$_2$CH$_3$, —OC(CH$_3$)$_3$ or —OPh];

tosyl (4-methylbenzenesulfonyl) [one or more hydroxyl groups are substituted by a group such as —OTs];

mesyl (methanesulfonyl or Ms) [one or more hydroxyl groups are substituted by —OMs or a similar group];

amino groups [one or more hydroxyl groups are substituted by a group such as a primary, secondary or tertiary amine group, including cyclic amines and aromatic amines];

azide groups [one or more hydroxyl groups are substituted by —N$_3$ or a similar group];

halo-substitutional groups [one or more hydroxyl groups are substituted by —F, —Cl, —Br or —I];

nitro groups [one or more hydroxyl groups are substituted by —ONO$_2$];

phosphorus-containing groups [one or more hydroxyl groups are substituted by a group such as —OPO$_3$H$_2$, —OPO$_3$R$_2$ (R is an alkyl or aryl) or —OPO$_3$HR, or two adjoining hydroxyl groups substituted by —OP(O)(CH$_3$)O— or a similar group];

the imidazole group and derivatives thereof;

the pyridine group and derivatives thereof;

sulfur-containing functional groups [one or more hydroxyl groups are substituted by a group such as —SCH$_3$, —SCH$_2$CH$_3$, —S(CH$_2$)$_2$CH$_3$, —SC(CH$_3$)$_3$, —OSO$_3^-$Na$^+$, —OCH$_2$CH$_2$SO$_3^-$Na$^+$, —OCH$_2$CH$_2$SO$_3^-$Na$^+$ or O(CH$_2$)$_3$SO$_3^-$Na$^+$];

alcohols, aldehydes, ketones or oxime groups;

carboxyl acid groups and derivatives thereof;

carbonate and carbamate groups;

silicon-, boron- or tin-containing groups [one or more hydroxyl groups are substituted by a group such as —OSi(CH$_3$)$_3$, —OSi(CH$_3$)$_2$H, —CH$_2$OSi(CH$_3$)$_3$, —CH$_2$OSi(CH$_3$)$_2$H, —OB(CH$_2$CH$_2$)$_2$, CH$_2$OB(CH$_2$CH$_2$)$_2$ or —CH$_2$OSn((CH$_2$)$_3$CH$_3$)$_3$]; and hydroxylalkyl groups such as the hydroxyethyl group and hydroxypropyl group.

Cyclic polyethers: C

Examples include the following crown ethers and heterocyclic compounds:

Crown ethers include 18-crown-6, benzo-15-crown-5, dicyclohexanone-18-crown-6, dibenzo-18-crown-6, dibenzo-24-crown-8, dibenzo-30-crown-10, bis(tert-butylbenzo)-18-crown-8,

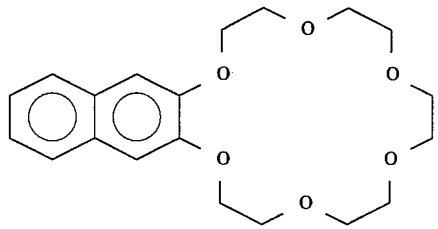

and

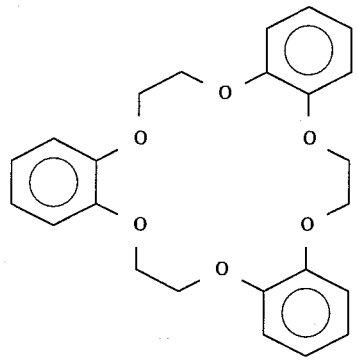

Heterocyclic compounds include the following ones:

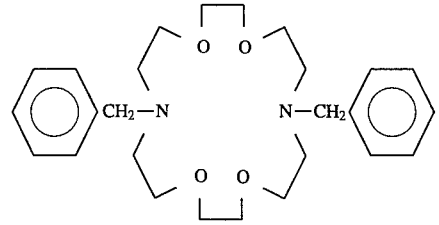
[C-②-1]

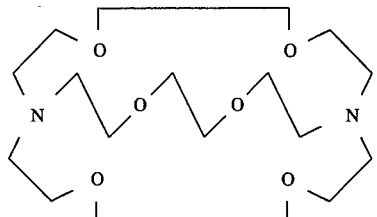
[C-②-2]

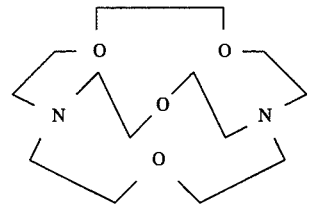

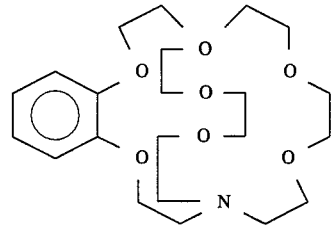

Non-cyclic polyethers: D

Examples include polyether compounds having an oxyalkylene group (e.g., oxyethylene group), an oxyarylene group (e.g., oxyphenylene group), two or more ether linkage groups or the like in the molecular structure thereof, represented by the following general formulas D1 or D2:

D1: A$^1$—O—[(—L—O—)$_m$—(—Ar—O—)$_n$]—A$^2$

D2: A$^1$—O—[(—L—O—)$_m$—(—CH$_2$—Ar—CH$_2$—O—)$_n$]—A$^2$

In the above formulas,

L represents an alkylene group (e.g., —CH$_2$CH$_2$—);

Ar represents an arylene group (e.g., 1,2-phenylene group);

$A^1$ and $A^2$ independently represent hydrogen, an alkyl group (e.g., methyl, ethyl, propyl, butyl), cycloalkyl group (e.g., cyclohexyl), monocyclic or polycyclic aryl group which may have a substituent (e.g., phenol or a phenol- or catechol-derived substitutional phenyl group such as o-nitrophenol, p-chlorophenol, o-cresol, tert-butylphenol, p-octylphenol or (thio)catechol; or 2-naphthol- or 2,3-dihydroxynaphthalene-derived substitutional naphthyl group substituted by a nitro group, alkyl group or halogen), aralkyl group (e.g., benzyl, phenethyl) or residue of a nitrogen-containing heterocyclic compound (e.g., 2-pyridyl, 8-quinolyl, 2-carbazolyl);

m and n independently represent an integer of 0 or more; it is preferable that, when n is 0, m is 3 or more, and when m is 0, n is 1 or more.

$[(-L-O-)_m-(-Ar-O-)_n]$ is a group resulting from the binding of m oxyalkylene groups and n oxyarylene groups in any order.

The polyether compound of formula D1 above is exemplified by the following:

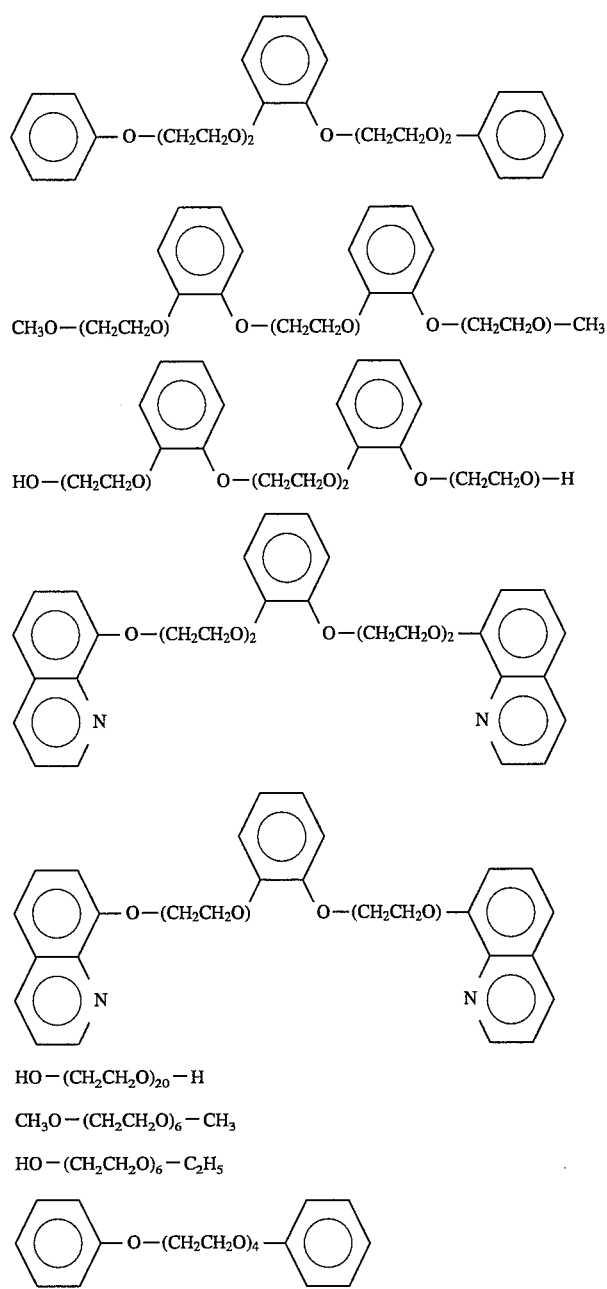

[D-①-1]

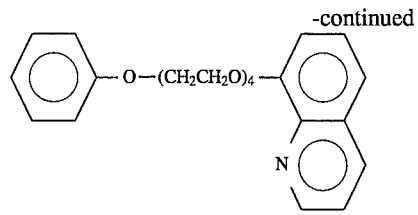
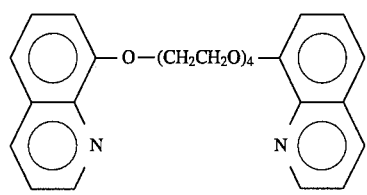
[D-①-2]
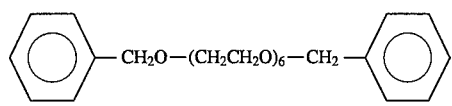
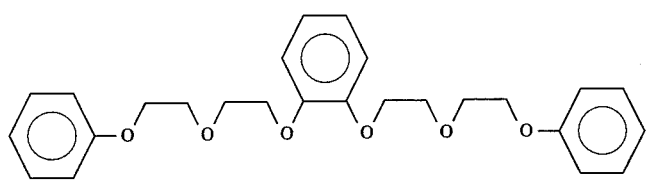
The polyether compound of formula D2 above is exemplified by the following:
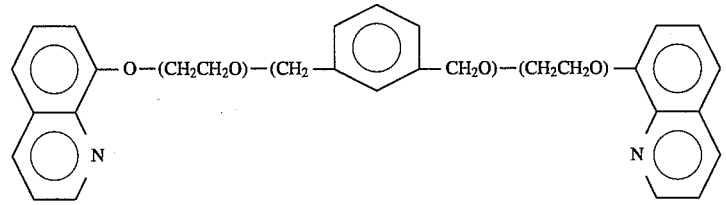
[D-②-1]
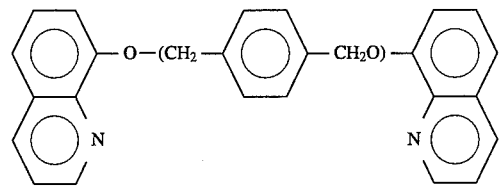
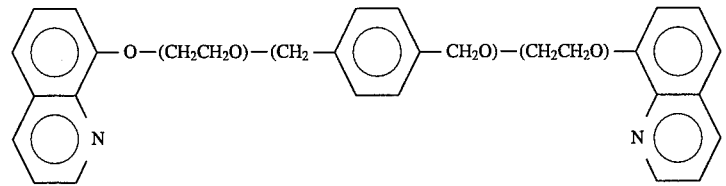
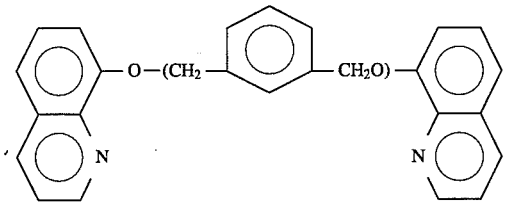

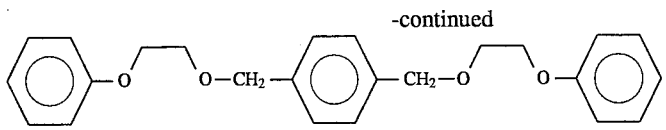

-continued

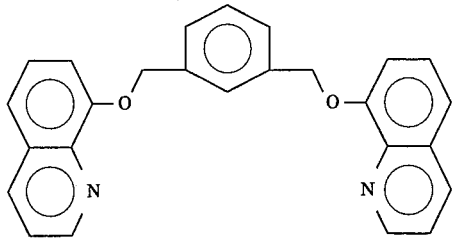

[D-②-2]

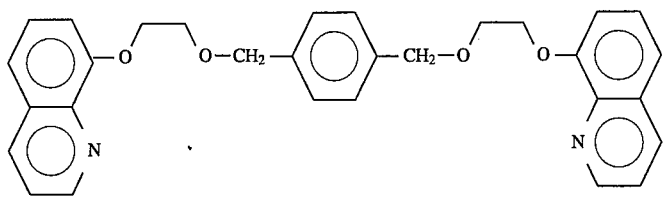

Example guest compounds for production of host-guest compounds in the present invention include the following organic acids, inorganic acids, organic bases, inorganic bases, and salts of these acids and bases.
Organic acids:
Carboxylic acid compounds such as acetic acid, oxalic acid, tartaric acid, benzoic acid, (alkyl)salicylic acid and naphthalenecarboxylic acid; and sulfonic acid compounds such as benzenesulfonic acid, p-toluenesulfonic acid, and naphthalenesulfonic acid which may be substituted by a hydroxyl group and/or amino group.
Inorganic acids:
Examples include mineral acids such as nitric acid, hydrochloric acid, sulfuric acid and phosphoric acid, and carbonic acid.
Organic bases:
Examples include primary, secondary or tertiary aliphatic (alkyl-substitutional) amines;
  aniline, dimethylaniline, and amines of derivatives thereof; and
  heterocyclic bases such as pyridine, quinoline and piperidine.
Inorganic bases:
Examples include alkali metal or alkaline earth metal hydroxides such as potassium hydroxide, sodium hydroxide, barium hydroxide and magnesium hydroxide.
Salts of organic acids, inorganic acids, organic bases and inorganic bases:
Examples include halides, thiocyanates, fluoroborates or acetates of alkali metals or alkaline earth metals; organic or inorganic ammonium salts; ammonium salts or quaternary ammonium salts of aliphatic or aromatic primary, secondary or tertiary amines; and metal salts of carboxylic acids or sulfonic acids having an aromatic ring.
Specifically, such salts are exemplified by the following compounds:
  Alkali metal halides: KF, KCl, KBr, CsF, LiF, LiCl, LiBr, RbF, CsCl
  Alkaline earth metal halides: $MgBr_2$, $MgI_2$, $BaI_2$, $CaCl_2$
  Alkali metal acetates, thiocyanates, fluoroborates: $CH_3COONa$, $CF_3COONa$, $Na(SCN)$, $K(SCN)$, $NaBF_4$
  Alkaline earth metal acetates, thiocyanates: $Ba(CH_3COO)_2$, $Mg(SCN)_2$, $Ba(SCN)_2$
  Ammonium salts of organic or inorganic acid: $NH_4F$, $NH_4(SCN)$, $NH_4BF_4$, $NH_4(CH_3COO)$
  Ammonium salts of primary, secondary or tertiary aliphatic (alkyl-substitutional) amine: $n-C_4H_9NH_3Br$, $n-C_3H_7NH_3Br$, $(n-C_4H_9)_2NH_2Br$, $(n-C_3H_7)_2NH_2Br$, $(C_2H_5)_3NHBr$
  Quaternary ammonium salts substituted by a lower alkyl group: $(CH_3)_4NBr$, $(CH_3)_4NCl$, $(CH_3)_4NI$
  Amine hydrochlorides and sulfates having an aromatic ring: Aniline hydrochloride and sulfate
  Metal salts of carboxylic acid having an aromatic ring: Alkali metal or alkaline earth metal salts of organic acids such as benzoic acid, (alkyl)salicylic acid, naphthalenecarboxylic acid and acetic acid
  Metal salts of sulfonic acid having an aromatic ring: Alkali (alkaline earth) metal salts of organic acids such as benzenesulfonic acid, p-toluenesulfonic acid and naphthalenesulfonic acid which may be substituted by a hydroxyl group and/or amino group As stated above, these guest compounds show no or almost no chargeability. However, they show high chargeability when host-guest compounds are formed from such guest compounds and host compounds as described above.

Of these guest compounds, aromatic carboxylic acids such as benzoic acid and (alkyl)salicylic acid are generally low in chargeability, although they are negatively chargeable. In addition, such aromatic carboxylic acids are difficult to use as charge control agents or charge enhancers, which are required to endure kneading with resin at relatively high temperatures, because they are sublimable compounds (apt to sublimate). However, host-guest complex formation between such an organic acid (guest compound) and cyclodextrin or the like (host compound) results in significantly improved sublimability and chargeability (the host-guest complex becomes harder to sublime and higher in chargeability), thus making it possible to knead the organic acid with resin at high temperatures to produce a suitable charge control agent or charge enhancer. The present inventor synthesized host-guest compounds (also referred to as host-guest complexes) as charge control agents or charge enhancers in the present invention, using commercially available cyclodextrins, cyclic or non-cyclic polyether compounds, calix(n)arene derivative synthesized by methods of synthesis known from the literature, and the above-described guest compounds. The methods of synthesis used are described by means of the following synthesis examples.

Synthesis Example 1: p-tert-butylcalix(8)arene octamethyl ether.$(CH_3)_4$.NI complex 1.408 g (1 mmol) of p-tert-butylcalix(8)arene octamethyl ether was dissolved in 50 ml of methanol.

To this solution, 0.603 g (3 mmol) of $(CH_3)_4$NI (tetramethylammonium iodide) was added, followed by heating to obtain a uniform mixture and further heating for 5 hours.

After this reaction mixture was cooled to room temperature, the resulting crystal was separated to yield the title compound calix(8)arene derivative.$(CH_3)_4$NI complex [Example Compound A-(1)].

Synthesis Example 2: Tetraethyl p-tert-butylcalix(4)arene tetraacetate.NaSCN complex 0.992 g (1 mmol) of tetraethyl p-tert-butylcalix(4)arene tetraacetate was dissolved in 100 ml of methanol.

To this solution, 0.243 g (3 mmol) of NaSCN (sodium thiocyanate) was added, followed by heating to a uniform mixture and subsequent filtration.

After this filtrate was cooled, the resulting crystal was separated to yield the title compound calix(4)arene derivative.NaSCN complex [Example Compound A-(10)].

Synthesis Example 3: α-cyclodextrin.benzoic acid complex 1.5 g (1.54 mmol) of α-cyclodextrin was dissolved in 150 ml of water at 50° C.

To this solution, a solution of 0.72 g (2 mmol) of benzoic acid in acetone (10 ml) was added at constant temperature, followed by heating for 1 hour. After this solution was cooled, the resulting white solid was separated by filtration to yield the title compound cyclodextrin.benzoic acid complex [Example Compound B-(1)].

Synthesis Example 4: Dibenzo-18-crown-6.KF complex

After a solution of 3.36 g (10 mmol) of dibenzo-18-crown-6 in 5 ml of chloroform and a solution of 0.37 g (10 mmol) of KF (potassium fluoride) in 5 ml of methanol were mixed and stirred at room temperature for 24 hours, the solvent was distilled off. The residue was recrystallized from chloroform-n-hexane to yield a crown ether derivative.KF complex [Example Compound C-(1)].

Synthesis Example 5: Non-cyclic polyether.$Ba(SCN)_2$ complex 1.63 g (3.64 mmol) of the polyether of D-②-2 above and 1.05 g (3.64 mmol) of $Ba(SCN)_2 \cdot 2H_2O$ (barium thiocyanate) were mixed and heated to about 100° C. to yield a white solid.

This solid was washed with acetone to yield a non-cyclic polyether.$Ba(SCN)_2$ complex [Example Compound D-(2)].

Example host-guest compounds as charge control agents or charge enhancers in the present invention are given below.

A: Calix arene complexes (for host compounds, the calix-(n)arene derivative represented by formula [I] is specified by $R^1$ and $R^2$.)

| | Host compound | | | | |
|---|---|---|---|---|---|
| No. | $R^1$ | n | $R^2$ | Guest compound | Chargeability |
| A-(1) | $CH_3$ | 8 | tert-$C_4H_9$ | $(CH_3)_4$.NI | + |
| A-(2) | $CH_3$ | 8 | tert-$C_4H_9$ | KBr | + |
| A-(3) | $C_2H_5$ | 6 | n-$C_8H_{17}$ | $(C_2H_5)_4$.NBr | + |
| A-(4) | $C_2H_5$ | 4 | n-$C_8H_{17}$ | KSCN | + |
| A-(5) | $CH_2COC_2H_5$ | 4 | tert-$C_4H_9$ | $C_4H_9NH_3$.Br | + |
| A-(6) | $CH_2COC_2H_5$ | 6 | tert-$C_4H_9$ | KSCN | + |
| A-(7) | $CH_2COC_2H_5$ | 4 | Cyclohexyl | $C_4H_9NH_3$.Br | + |
| A-(8) | $CH_2COC_2H_5$ | 6 | Cyclohexyl | KF | + |
| A-(9) | $CH_2COOC_2H_5$ | 6 | tert-$C_4H_9$ | $C_4H_9NH_3$.Br | + |
| A-(10) | $CH_2COOC_2H_5$ | 4 | tert-$C_4H_9$ | NaSCN | + |
| A-(11) | $CH_2COOC_2H_5$ | 4 | phenyl | $Ba(SCN)_2$ | + |
| A-(12) | $CH_2COOC_2H_5$ | 4 | phenyl | $NaBF_4$ | + |

B: Cyclodextrin complexes

| No. | Host compound | Guest compound | Chargeability |
|---|---|---|---|
| B-(1) | α-cyclodextrin | Benzoic acid | − |
| B-(2) | β-cyclodextrin | Salicylic acid | − |
| B-(3) | 2,6-dimethyl-β-cyclodextrin | Benzoic acid | − |
| B-(4) | γ-cyclodextrin | tert-butyl-salicylic acid | − |

C: Cyclic polyether complexes

| No. | Host compound | Guest compound | Chargeability |
|---|---|---|---|
| C-(1) | Dibenzo-18-crown-6 | KF | + |
| C-(2) | Dibenzo-18-crown-6 | KSCN | + |
| C-(3) | Bis(tert-butylbenzo)-18-crown-8 | LiF | + |
| C-(4) | Benzo-15-crown-5 | $NH_4F$ | + |
| C-(5) | Benzo-15-crown-5 | $Ba(SCN)_2$ | + |
| C-(6) | Hetero-cyclic polyether(C-②-1) | KF | + |
| C-(7) | Hetero-cyclic polyether(C-②-2) | CsF | + |

D: Non-cyclic polyether complexes

| No. | Host compound | Guest compound | Chargeability |
|---|---|---|---|
| D-(1) | Non-cyclic polyether(D-①-1) | KSCN | + |

-continued

| No. | Host compound | Guest compound | Charge-ability |
|---|---|---|---|
| D-(2) | Non-cyclic polyether(D-1̂-2) | Ba(SCN)$_2$ | + |
| D-(3) | Non-cyclic polyether(D-2̂-1) | NH$_4$SCN | + |
| D-(4) | Non-cyclic polyether(D-2̂-2) | FK | + |

The chargeable resin powder, toner for developing electrostatic images and powder coating for electrostatic painting of the present invention preferably contain 0.5 to 10 parts by weight of the above-described host-guest compound as a charge control agent or charge enhancer per 100 parts by weight of resin. More preferably, the charge control agent or charge enhancer is contained at 1 to 5 parts by weight per 100 parts by weight of resin.

Also, in the present invention, a chargeable resin powder, toner for developing electrostatic images and powder coating for electrostatic painting having an excellent charging property can be provided by using a host-guest compound of the present invention as a charge control agent or charge enhancer in combination with a conventional charge control agent or charge enhancer such as a nigrosine dye or azometal complex dye, which are relatively excellent in heat resistance, a colorless metal complex of (alkyl)salicylic acid or salicylamine, or a quaternary ammonium salt or polyamine resin charge control agent or charge enhancer.

The resin used in the chargeable resin powder, toner for developing electrostatic images and powder coating for electrostatic painting of the present invention is exemplified by the following known resins for toners or paints.

Resins for toners include thermoplastic resins such as styrene resin, styrene-acrylic resin, styrene-butadiene resin, styrene-maleic acid resin, styrene-vinyl methyl ether resin, styrene-methacrylate copolymer, polyester resin and polypropylene resin; resins for paints include thermoplastic resins such as acrylic resin, polyolefin resin, polyethylene resin, polyester resin and polyamide resin, and thermosetting resins such as phenol resin, epoxy resin and polyester resin.

These resins may be used singly or in combination.

For preferable use of a resin for toners in a toner used for full-color imaging by subtractive mixing or for OHP (overhead projectors) etc., the resin for toners is required to have special properties, for example, it should be transparent, substantially colorless (no tone damage occurs in the toner image), compatible with the charge control agent in the toner of the present invention, fluid under appropriate heat or pressure, and pulverizable. Examples of such resins for preferable use include styrene resin, acrylic resin, styrene-acrylic resin, styrene-methacrylate copolymer and polyester resin.

The chargeable resin powder, toner for developing electrostatic images and powder coating for electrostatic painting of the present invention may incorporate various known dyes and pigments as coloring agents. Examples of such dyes and pigments which can be used in toners and powder coatings include organic pigments such as Quinophthalone Yellow, Isoindolinone Yellow, Perinone Orange, Perillene Maroon, Rhodamine 6G Lake, Quinacridone Red, Anthanthrone Red, Rose Bengale, Copper Phthalocyanine Blue, Copper Phthalocyanine Green and diketopyrrolopyrrole pigments, and inorganic pigments and metal powders such as carbon black, titanium white, titanium yellow, ultramarine, cobalt blue, red iron oxide, aluminum powder and bronze.

Coloring agents for color toners for developing electrostatic images include various oil-soluble dyes or dispersion dyes such as azo dyes, quinophthalone dyes, anthraquinone dyes and phthalocyanine dyes, and triarylmethane dyes and xanthene dyes modified with resins such as rosin, rosin-modified phenol and rosin-modified maleic acid.

The toner for developing electrostatic images of the present invention may incorporate the above-mentioned coloring agents singly or in combination. Dyes and pigments having a good spectral property can be preferably used to prepare a toner of the three primaries for full-color imaging. Chromatic monocolor toners may incorporate an appropriate combination of a pigment and dye of the same color tone, such as a quinophthalone pigment and dye, a rhodamine pigment and dye, or a phthalocyanine pigment and dye, as a coloring agent.

The chargeable resin powder, toner for developing electrostatic images, and powder coating for electrostatic painting of the present invention are, for example, produced as follows:

A chargeable resin powder of the desired particle size, such as a toner having an average particle size of 5 to 20 μm or a powder coating having an average particle size of 20 to 250 μm can be obtained by thoroughly mixing a resin and coloring agent as described above and a host-guest compound as described above as a charge control agent or charge enhancer, and, if necessary, a fluidizing agent, metal powder, filler, hardener, plasticizer and other additives, using a ball mill or another mechanical mixer, subsequently kneading the mixture in a molten state using a hot kneader such as a heat roll, kneader or extruder, cooling and solidifying the mixture, and then pulverizing the mixture and classifying the particles.

Other applicable methods include the method in which the starting materials are dispersed in a resin solution, followed by spray drying, to yield a resin powder, and the method in which a given set of starting materials are mixed in a monomer for the resin to yield an emulsified suspension which is then polymerized to yield a resin powder.

When using the toner for developing electrostatic images of the present invention as a two-component developer, development can be achieved by the two-component magnetic brush developing process or another process, using the toner in mixture with carrier powder.

Any known carrier can be used. Examples of the carrier include iron powder, nickel powder, ferrite powder and glass beads of about 50 to 200 μm in particle size, and such materials as coated with acrylate copolymer, styrene-acrylate copolymer, styrene-methacrylate copolymer, silicone resin, polyamide resin, ethylene fluoride resin or the like.

When using the toner of the present invention as a one-component developer, an appropriate amount of fine powder of a ferromagnetic material such as iron powder, nickel powder or ferrite powder may be added and dispersed in preparing the toner as described above. Examples of developing processes which can be used in this case include contact development and jumping development.

The powder coating for electrostatic painting of the present invention may be colored by containment of a pigment, and may incorporate white fillers such as titanium white, talc, kaolin, silica, alumina, calcium carbonate, aluminum sulfate, barium sulfate, calcium sulfate, titanium oxide and calcium phosphate.

Painting according to the powder coating for electrostatic painting of the present invention can be achieved by common electrostatic powder painting methods such as the corona charge method, the tribocharge method and the hybrid method, and makes it possible to obtain desirable features of powder coatings, including 1) the capability of forming a failure-less, i.e. failure-free thick paint film, 2)

improvement in paint film performance, and 3) absence of paint loss on painting.

EXAMPLES

The present invention is hereinafter described in more detail by means of the following examples, but the invention is not to be limited by these examples. In the description below, "part(s) by weight" are referred to as "part(s)" for short.

Application Example I

Toners for developing electrostatic images

EXAMPLE 1

Resin:
Styrene-acrylic copolymer resin [HIMER SMB600 (trade name), produced by Sanyo Kasei Co., Ltd.] . . . 100 parts
Coloring agents:
Triarylmethane dye [Oil Blue #613 (trade name), produced by Orient Chemical Industries Ltd.] . . . 5 parts
Copper phthalocyanine dye . . . 3 parts
Charge control agent:
Example Compound A-1(1)
[calix(8)arene derivative.$(CH_3)_4$N.I complex] . . . 3 parts The above ingredients were uniformly pre-mixed using a high-speed mixer, and then kneaded in a molten state using an extruder, cooled, and roughly milled in a vibration mill. The obtained coarse product was finely pulverized using an air jet mill equipped with a classifier to obtain a positively chargeable cyan toner of 10 to 20 μm in particle size.

5 parts of this toner were admixed with 95 parts of an iron powder carrier [TEFV 200/300 (trade name), produced by Nippon Teppun Co., Ltd.) to yield a developer. When this developer was used for a commercial copying machine (produced by CANON) to form toner images repeatedly, fog-free good-quality images without image density reduction were obtained, demonstrating good charge stability and sustainability.

EXAMPLE 2

A toner and developer were prepared and evaluated in the same manner as in Example 1, except that the charge control agent used in Example 1 [Example Compound A-(1)] was replaced with Example Compound A-(10) as obtained in Synthesis Example 2 [calix(4)arene derivative.NaSCN complex]. Good properties were confirmed, and images of good quality were obtained, as in Example 1.

EXAMPLE 3

A toner and developer were prepared in the same manner as in Example 1, except that the charge control agent used in Example 1 [Example Compound A-(1)] was replaced with Example Compound C-(1) as obtained in Synthesis Example 4 [cyclic polyether.KF complex]. Good properties were confirmed, and images of good quality were obtained, as in Example 1.

EXAMPLE 4

A toner and developer were prepared and evaluated in the same manner as in Example 1, except that the charge control agent used in Example 1 [Example Compound A-(1)] was replaced with Example Compound D-(2) as obtained in Synthesis Example 5 [non-cyclic polyether.$Ba(SCN)_2$ complex]. Good properties were confirmed, and images of good quality were obtained, as in Example 1.

EXAMPLE 5

Styrene-acrylic copolymer resin [HIMER SMB600 (trade name), produced by Sanyo Kasei Co., Ltd.] . . . 100 parts
Carbon black [MA-100 (trade name), produced by Mitsubishi Chemical Industries, Ltd.] . . . 5 parts Example Compound A-(4) [calix(8)arene derivative.KSCN complex] . . . 3 parts The above ingredients were treated in the same manner as in Example 1 to yield a positively chargeable black toner, which was then used to prepare a developer. When this developer was used to obtain images, fog-free good-quality images without image density reduction were obtained, demonstrating good charge stability and sustainability.

EXAMPLE 6

Polyester resin [HP-301 (trade name), produced by The Nippon Synthetic Chemical Industry, Co., Ltd.] . . . 100 parts
Rhodamine dye [Oil Pink #312 (trade name), produced by Orient Chemical Industries Ltd.] . . . 3 parts
Quinacridone red . . . 3 parts
Example Compound B-(1) [cyclodextrin.benzoic acid complex] . . . 3 parts The above ingredients were treated in the same manner as in Example 1 to yield a negatively chargeable magenta toner, which was then used to prepare a developer.

When this developer was used to obtain images, fog-free good-quality magenta images without image density reduction were obtained, demonstrating good charge stability and sustainability.

EXAMPLE 7

Polyester resin [HP-301 (trade name), produced by The Nippon Synthetic Chemical Industry, Co., Ltd.] . . . 100 parts
Tri-iron tetroxide [EPT-500 (trade name), produced by Toda Kogyo Corporation] . . . 40 parts
Low polymer polypropylene [Biscal 500P (trade name), produced by Sanyo Kasei Co., Ltd.] . . . 10 parts
Carbon black [MA-100 (trade name), produced by Mitsubishi Chemical Industries, Ltd.] . . . 6 parts
Example Compound A-(12) [calix(4)arene derivative.N-$aBF_4$ complex] . . . 3 parts The above ingredients were uniformly pre-mixed using a ball mill to yield a premix, which was then kneaded in a molten state at 180° C. using a twin-screw extruder, cooled and thereafter roughly crushed, finely pulverized and classified to yield a one-component toner of 5 to 15 μm in particle size.

When this toner was used for a commercial copying machine to form toner images, fog-free good-quality images with good thin-line reproducibility having a solid portion reflecting density of 1.35 were obtained.

Comparative Example 1

To compare charging properties, cyan toner and a developer were prepared and used to form toner images in the same manner as in Example 1, except that Example Compound A-(1) was replaced with $(CH_3)_4N.I$ (tetramethylammonium iodide). The initial amount of blowoff charge was not more than +5 μC/g. The charging properties of this developer lacked stability and sustainability.

Comparative Example 2

A black toner and a developer were prepared in the same manner as in Example 5, except that Example Compound A-(1) was not used. Image scattering and disturbance and fogging were seen; the black toner did not meet the requirements for a toner.

Application Example II

Electrostatic powder coating

The powder coating for electrostatic painting of the present invention can be applied by common methods of electrostatic painting such as the corona charge method, the tribocharge method and the hybrid method. Here, electrostatic painting mainly by the frictional charging method is described with reference to Examples 8 through 12.

At least 95 parts of a resin for powder coating, 2 parts of a host-guest compound as described above as a charge enhancer and 0 to 5 parts of a coloring agent were uniformly pre-mixed using a ball mill to yield a premix, which was then kneaded in a molten state using an extruder, cooled and thereafter roughly crushed, finely pulverized and classified to yield an electrostatic powder coating composition of 20 to 250 μm in particle size.

When this powder coating was used in a painting test on a steel plate by the tribocharge method using a tribocharging electrostatic powder coating machine [trade name (TRIBOMATIC), produced by Nordson], a painted object of good appearance was obtained at a painting efficiency exceeding 95%.

In the tribocharge method, a powder gun for positive charge was used for a positively chargeable powder coating; a powder gun for negative charge was used for a negatively chargeable powder coating. In Example 10, a painting test by the corona charge method (voltage applied 50 kV) was also performed.

What is claimed is:

1. A chargeable resin powder comprising at least a thermosetting resin or a thermoplastic resin, and a charge control agent or a charge enhancer, wherein a host-guest compound formed from a combination of a chargeable host compound and a guest compound of substantially no chargeability is contained as a charge control agent or charge enhancer which controls or enhances resin powder charging.

2. A chargeable resin powder comprising at least a thermosetting resin or a thermoplastic resin, and a charge control agent or a charge enhancer, wherein a host-guest compound formed from a combination of a host compound and a guest compound is contained as a charge control agent or charge enhancer which controls or enhances resin powder charging, and wherein said host compound is a cyclic or non-cyclic compound selected from the group consisting of calix arenes, cyclodextrins, cyclic polyethers and non-cyclic polyethers, and said guest compound is a compound selected from the group consisting of organic acids, inorganic acids, organic bases, inorganic bases and salts of these acids and bases, said charge control agent having positive chargeability where said host compound is such a calix arene, cyclic polyether or non-cyclic polyether and having a negative chargeability where said host compound is such a cyclodextrin.

3. A powder coating for electrostatic painting comprising the chargeable resin powder of claim 1 or 2.

4. A toner for developing electrostatic images comprising the chargeable resin powder of claim 1, wherein said chargeable resin powder contains a coloring agent.

5. A toner for developing electrostatic images comprising the chargeable resin powder of claim 2, wherein said chargeable resin powder contains a coloring agent.

6. A powder coating for electrostatic painting comprising the chargeable resin powder of claim 1.

7. A powder coating for electrostatic painting comprising the chargeable resin powder of claim 2.

8. Chargeable resin powder comprising a thermosetting or thermoplastic resin and a charge control agent or charge enhancer therefor comprising a substantially colorless, heavy metal-free host-guest compound of high chargeability formed from a combination of a host compound which is a chargeable organic compound and a guest compound which

| Example | Composition of powder coating | Chargeability of powder coating | Painting efficiency (%) | |
|---|---|---|---|---|
| | | | Tribocharge method | Corona charge method |
| 8 | 98 parts of acrylic resin and 2 parts of Example Compound A-(1) | ++ | 98 | |
| 9 | 98 parts of acrylic resin and 2 parts of Example Compound A-(10) | + | 96 | |
| 10 | 98 parts of polyester resin and 2 parts of Example Compound B-(1) | − | 97 | 96 |
| 11 | 98 parts of polyamide resin and 2 parts of Example Compound C-(1) | + | 97 | |
| 12 | 98 parts of epoxy resin and 2 parts of Example Compound D-(4) | ++ | 98 | | is an organic or inorganic compound of substantially no chargeability, and which host-guest compound controls or enhances charging of the resin powder.

9. Chargeable resin powder comprising a thermosetting or thermoplastic resin and a charge control agent or charge enhancer therefor comprising a substantially colorless, heavy metal-free host-guest compound formed from a combination of a host compound which is a cyclic or non-cyclic compound selected from the group consisting of calix arenes, cyclodextrins, cyclic polyethers and non-cyclic polyethers, and a guest compound which is a compound selected from the group consisting of organic acids, inorganic acids, organic bases, inorganic bases and salts of these acids and bases, and which host-guest compound controls or enhances charging of the resin powder, said charge control agent having positive chargeability where said host compound is such a calix arene, cyclic polyether or non-cyclic polyether and having a negative chargeability where said host compound is such a cyclodextrin.

10. Chargeable resin powder of claim 8 in the form of a toner for developing electrostatic images.

11. Chargeable resin powder of claim 8 in the form of a toner for developing electrostatic images and containing a coloring agent.

12. Chargeable resin powder of claim 9 in the form of a toner for developing electrostatic images.

13. Chargeable resin powder of claim 9 in the form of a toner for developing electrostatic images and containing a coloring agent.

14. Chargeable resin powder of claim 8 in the form of a powder coating composition for electrostatic painting.

15. Chargeable resin powder of claim 8 in the form of a powder coating composition for electrostatic painting and containing a coloring agent.

16. Chargeable resin powder of claim 9 in the form of a powder coating composition for electrostatic painting.

17. Chargeable resin powder of claim 9 in the form of a powder coating composition for electrostatic painting and containing a coloring agent.

* * * * *